June 3, 1969    R. E. STEIN    3,447,484
RESILIENTLY CENTERED LOCOMOTIVE TRUCK
Filed Aug. 14, 1967    Sheet 1 of 2

INVENTOR:
ROBERT E. STEIN
BY Bedell & Burgess
ATTORNEY.

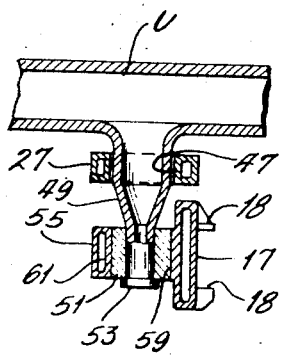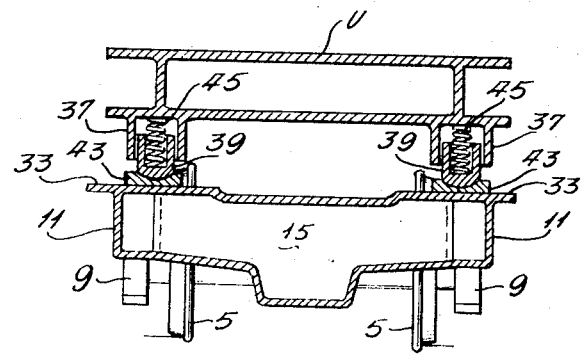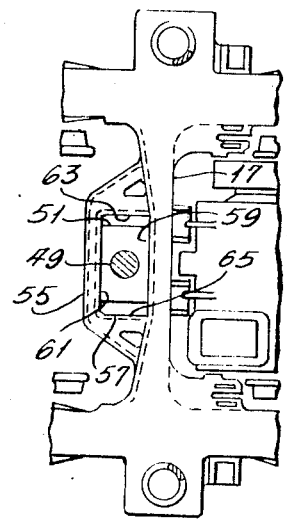

United States Patent Office 3,447,484
Patented June 3, 1969

3,447,484
RESILIENTLY CENTERED LOCOMOTIVE TRUCK
Robert E. Stein, Dorsey, Ill., assignor to General Steel Industries, Inc., Granite City, Ill., a corporation of Delaware
Filed Aug. 14, 1967, Ser. No. 660,445
Int. Cl. B61f 5/06, 5/18
U.S. Cl. 105—136
16 Claims

ABSTRACT OF THE DISCLOSURE

A railway locomotive truck having three axles, a rigid frame carried thereby and including a transverse transom between the middle axle and one end axle, transversely spaced upwardly facing bearings on the frame between the middle axle and the other end axle, a transverse bolster resiliently supported on said frame above said transom for lateral and vertical movement thereon, a vertical cylindrical bearing at the center of said bolster, a block transversely slidably mounted in said transom at a level substantially lower than the bolster, said block containing another vertical cylindrical bearing in vertical alignment with said bolster bearing, a cylindrical element depending from the vehicle underframe and pivotally received in both said cylindrical bearings, said bolster having transversely speced upwardly-facing horizontal bearing surfaces, said underframe being supported by vertically sprung sliding shoes on said frame-mounted bearing surfaces and slidably supported on said bolster-mounted bearing surfaces. By means of the transversely sliding block, longitudinal traction forces are transmitted from the truck to the underframe at a much lower level than the bolster, thus reducing load transference which would occur if the longitudinal forces were transmitted from truck to underframe at bolster level.

Field of the invention

The invention relates to railway rolling stock and consists particularly in a locomotive suspension system in which the locomotive underframe is supported on a three-axle swiveling power truck by means of a bolster spring supported from the truck frame and overlying the same, with means for transmitting longitudinal forces from the truck to the underframe at a level substantially lower than the bolster.

Description of the prior art

In conventional motor trucks of the type in which the body is pivotally supported by a center plate on a laterally movable bolster carried by springs supported from the truck frame, tractive forces are transmitted from the truck frame to the body through the center plate, which is necessarily at a higher level than the axles to clear the motor. Since tractive force is applied to the truck frame through the axles, there is a tendency of the truck frame to tilt longitudinally about the center plate as a fulcrum, with resultant unloading of the axle or axles forward of the center plate and overloading of the axle or axles rearward of the center plate.

Summary of the invention

The invention solves the problem of load transference described above in trucks where the body is carried on a spring-supported lateral motion bolster, by slidably supporting the body on the ends of the bolster, and pivoting the body on the bolster, but extending the body pivot member downward past the bolster into vertical sliding and pivotal relation with an element movable transversely but not longitudinally of the truck frame, the last named element being at a level substantially lower than the bolster, so as to transmit longitudinal forces from the truck to the body at this level, while permitting free pivoting, lateral and vertical movement between truck and body.

Brief decription of the drawings

Figure 1:
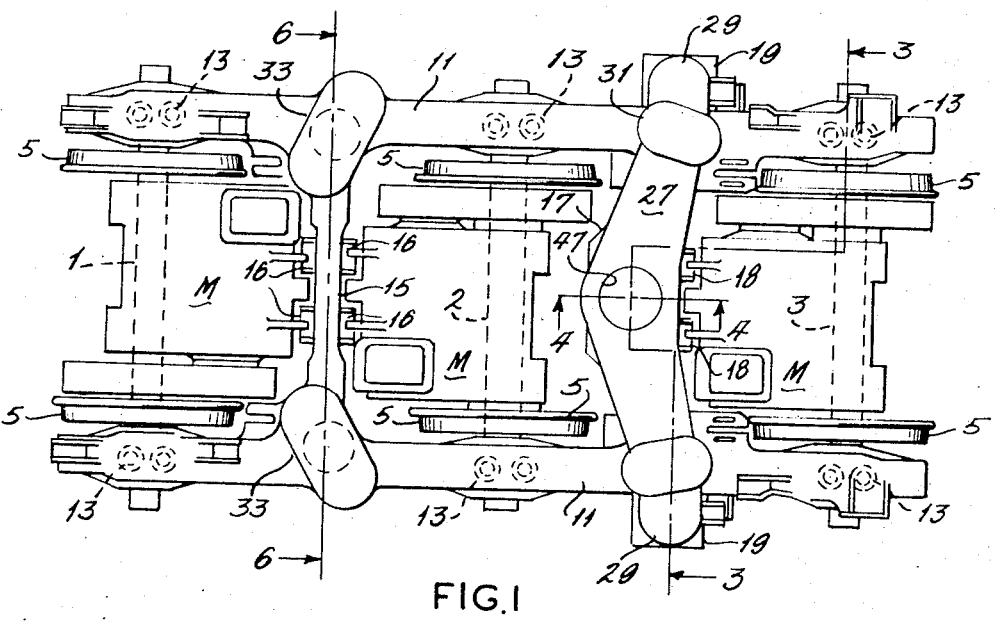
Figure 2:
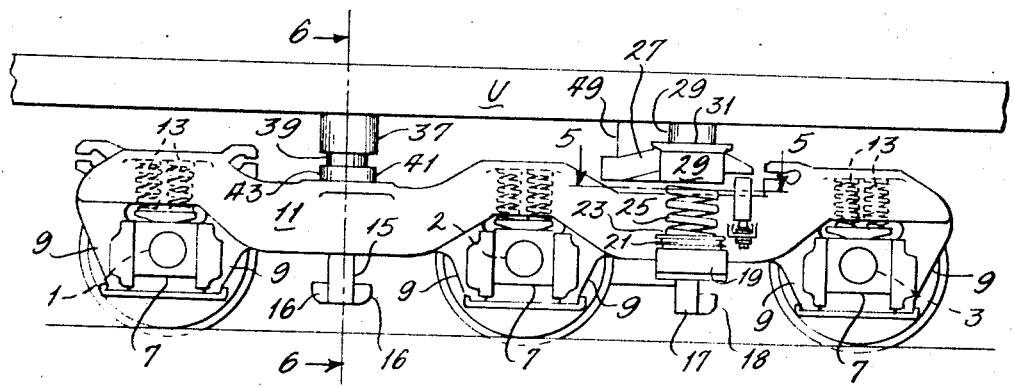
Figure 3:
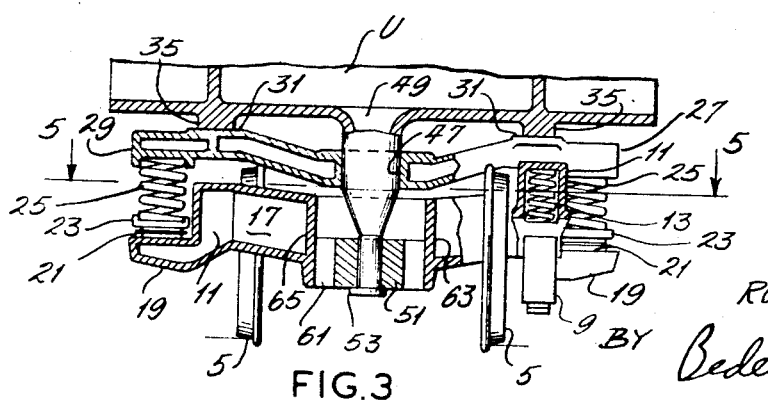

FIG. 1 is a top view of a truck embodying the invention.
FIG. 2 is a side elevation view of the truck illustarted in FIG. 1 and a portion of the locomotive underframe.
FIG. 3 is a transverse vertical sectional view along line 3—3 of FIG. 1.
FIG. 4 is a fragmentary longitudinal vertical sectional view along line 4—4 of FIG. 1.
FIG. 5 is a fragmentary horizontal sectional view along line 5—5 of FIGS. 2 and 3.
FIG. 6 is a transverse vertical sectional view along line 6—6 of FIGS. 1 and 2.

Description of the preferred embodiment

The truck comprises three spaced axles 1, 2 and 3, each rigidly mounting a pair of transversely spaced flanged wheels 5. Journal boxes 7 are rotatably mounted on the ends of each axle and are vertically slidably received in jaws formed between pedestal legs 9 of transversely spaced longitudinally extending truck frame side members 11. Coil springs 13 supported on boxes 7 extend upwardly into pockets in side members 11 whereby to resiliently support the truck side members 11 on the axles. Between end axle 1 and middle axle 2, and between middle axle 2 and end axle 3, side members 11 are rigidly connected by transverse transom members 15 and 17 respectively.

Each axle mounts a traction motor M. The noses of motors M on axles 1 and 2 extend away from their axles toward each other and are supported by brackets 16 on transom 15, and the nose of the motor on axle 3 is supported on transom 17 by brackets 18.

Transom member 17 is extended outwardly past both side members 11 to form shelves or brackets 19. Laterally resilient sandwiches 21, comprising elastomeric pads interleaved with metal plates, are seated on brackets 19 and support spring seat cups 23, in which are seated upright coil springs 25, and a tarnsverse load supporting bolster 27 is supported at its ends on springs 25 by downwardly facing spring cap portions 29.

For supporting the locomotive underframe, bolster 27 is formed near its end with a transversely spaced pair of upwardly facing bearing surfaces 31 of oblong shape elongated normal to radii through the center of the bolster, i.e., generally lengthwise of the truck, and the truck frame is formed, at the juncture of side members 11 and transom 15, with a pair of transversely spaced upwardly facing flat horizontal bearing surfaces 33 also elongated normal to radii through the center of the bolster, i.e., generally transversely of the truck.

Locomotive underframe U is formed with rigid depending downwardly facing shoes 35 slidably resting on bolster bearing surfaces 31, and above bearing surfaces 33 underframe U is formed with cylindrical pockets 37 in which are vertically slidably received plungers 39, the spherical lower ends 41 of which are seated on shoes 43, which slidably rest on frame bearing surfaces 33. Part of the body load is supported on the latter bearing surfaces by upright coil springs 45, in pockets 37, which resiliently maintain shoes 41 in engagement with bearing surfaces 33.

To provide for swivel of the truck relative to the underframe, bolster 27 is apertured at its center to form a vertical cylindrical bearing 47, and the underframe is formed with a depending cylindrical post member 49 pivotally received in bearing 47.

For transmitting longitudinal tractive forces from driving axles 1, 2 and 3 to underframe U at the level of the axles, underframe post member 49 extends downwardly through the bolster to the axle level in the space between transom 17 and middle axle motor M, where it is pivotally received in vertically cylindrically apertured block 51, which it supports by means of a flange 53 at its lower end.

The central portion of transom 17, underlying bolster 27, is deepened to the level of the axles and is formed with a horizontal projection 55 extending lengthwise of the truck toward middle axle 2 and underlying bolster cylindrical bearing 47. A vertical opening 57 of rectangular shape in plan is defined in projection by transverse vertical walls 59 and 61 of transom 15 and projection 55 respectively, walls 59 and 61 being sufficiently spaced apart lengthwise of the truck to slidably receive block 51 between them, the ends of the rectangular opening, defined by projection longitudinal walls 63 and 65, being sufficiently spaced apart to permit block 51 to move transversely the same distance as the bolster on springs 25.

With this arrangement, as motors M drive the axles, tractive force is transmitted from axles 1, 2 and 3, through journal boxes 7, pedestal legs 9, and frame side members 11 to transom 15, thence, through transverse walls 59 and 61, block 51 and post 49 to underframe U, and load transference is thus avoided. Because of the freedom of block 51 to move vertically and transversely between webs 59 and 61 and because of the pivoted relation between post 49 and block 51, vertical and lateral movements of the underframe on the truck, as accommodated by bolster springs 25, plunger springs 45, and the slidable relation of shoes 43 with truck frame bearing surfaces 33, will be freely permitted, as will swiveling movements accommodated by the pivotal relation of post 49 and bolster cylindrical bearing 47 and the slidable relation of shoes 35 and 43 and bearings 31 and 33 respectively.

The details of the locomotive construction described above may be varied without departing from the spirit of the invention, and the exclusive use of those modifications is contemplated.

What is claimed is:

1. A railway truck having first and second wheeled axles spaced apart lengthwise thereof, a rigid frame supported on said axles and having transversely spaced, longitudinally extending side members and a transverse transom connecting said side members between said axles, vertically and laterally yieldable resilient means carried by said frame, a transverse bolster overlying said transom and supported on said resilient means, said bolster having upwardly facing flat horizontal surface portions adapted for slidable engagement with a supported underframe, and a cylindrical aperture at its center for pivotally receiving a cylindrical element rigidly depending from the underframe, an aperture in said transom at a level substantially lower than said bolster and adapted to receive the lower end of the cylindrical element and to hold the same against movement lengthwise of said truck frame while permitting transverse and vertical movements of the cylindrical element with respect to said truck frame.

2. A railway truck according to claim 1 including a block slidably received in said transom aperture at a level substantially lower than said bolster for movement transversely of the truck and vertically cylindrically apertured to pivotally receive the cylindrical element depending from the supported underframe.

3. A railway truck according to claim 2, including a third wheeled axle spaced longitudinally of the truck from said second axle in the opposite direction from said first axle.

4. A railway truck according to claim 3 having a traction motor on said middle axle and extending therefrom lengthwise of the truck away from said first-named transom and toward said other transom, said transom projecting lengthwise of the truck into the space unoccupied by said motor.

5. A railway truck according to claim 4 wherein said frame includes a second transverse transom between said middle axle and the other end axle, said motor having a nose portion extending toward said second transom and supported therefrom.

6. A railway truck according to claim 3 in which said frame mounts a pair of transversely spaced upwardly facing bearings between said second and third axles and adapted for horizontal sliding and vertically resilient support of the underframe.

7. A railway truck according to claim 6 in which said frame mounted bearings are transversely spaced upwardly facing flat horizontal surfaces adapted for slidable engagement with elements resiliently depending from the supported underframe.

8. A railway truck according to claim 7 in which there are a pair of said first named upwardly facing surfaces on said bolster spaced apart transversely of the truck.

9. A railway truck according to claim 2 in which said frame side members have laterally outwardly extending shelves abreast of said first named transom, said resilient means being seated on said shelves.

10. A railway truck according to claim 9 in which said resilient means comprise elastomeric elements yieldable transversely of the truck.

11. A railway truck according to claim 10 in which said resilient means comprise upright springs seated on said resilient means and yieldable vertically.

12. A railway locomotive comprising a truck having first and second wheeled axles spaced apart lengthwise thereof, a rigid frame supported on said axles and having transversely spaced, longitudinally extending side members and a transverse transom connecting said side members between said axles, vertically and laterally yieldable resilient means carried by said frame, a transverse bolster overlying said transom and supported on said resilient means, said bolster having upwardly facing flat horizontal surface portions and a cylindrical aperture at its center, an aperture in said transom at a level substantially lower than said bolster, and an underframe formed with rigid downwardly facing horizontal surface portions in slidable engagement with said bolster upwardly facing surface portions and with a depending cylindrical element pivotally received in said bolster aperture and extending downwardly therethrough into said transom aperture, said transom aperture receiving the lower end of said cylindrical element and holding the same against movement lengthwise of said truck frame while permititng transverse and vertical movements of said cylindrical element with respect to said truck frame.

13. A railway locomotive according to claim 12 in which said bolster is formed with transversely spaced upwardly facing surfaces and said underframe is formed with downwardly facing flat horizontal surfaces in slidable engagement with said bolster upwardly facing surfaces.

14. A railway locomotive according to claim 12 including a block slidably received in said transom aperture at a level substantially lower than said bolster for movement transversely of the truck and vertically cylindrically apertured to pivotally receive said cylindrical element, a third wheeled axle spaced longitudinally of the truck from said second axle in the opposite direction from said first axle, a pair of transversely spaced upwardly facing horizontal surfaces on said truck frame between said second and third axles, there being a pair of said first-named upwardly facing surface portions on said bolster spaced apart transversely of said truck, said underframe downwardly facing surface portions being similarly spaced, said underframe also having vertically resiliently mounted elements in slidable engagement with said truck frame upwardly facing surfaces.

15. A railway locomotive according to claim 14 in which said depending cylindrical element is pivotally received within said block aperture.

16. A railway locomotive according to claim 15 including means on said cylindrical element supporting said block, said block being free to tilt transversely of the truck in said transom aperture in accordance with transverse roll of said bolster and said underframe on said bolster supporting resilient means.

References Cited

UNITED STATES PATENTS

| 844,151 | 2/1907 | Lindenthal | 105—199 |
| 1,544,125 | 6/1925 | Bell | 105—199 XR |
| 2,499,087 | 2/1950 | Bourdon | 105—199 |
| 2,632,405 | 3/1953 | Ivalt | 105—199 XR |
| 2,705,924 | 4/1955 | Travilla et al. | 105—199 XR |
| 2,925,789 | 2/1960 | Wintemberg | 105—199 XR |

ARTHUR L. LA POINT, *Primary Examiner.*

HOWARD BELTRAN, *Assistant Examiner.*

U.S. Cl. X.R.

105—175, 189, 196, 199